United States Patent [19]

Okajima et al.

[11] Patent Number: 4,865,433
[45] Date of Patent: Sep. 12, 1989

[54] ZOOM LENS INCORPORATING DIAPHRAGM

[75] Inventors: Hidekazu Okajima; Kazuya Matsuda, both of Kanagawa, Japan

[73] Assignee: Canon Kabushiki Kaisha, Tokyo, Japan

[21] Appl. No.: 877,871

[22] Filed: Jun. 24, 1986

[30] Foreign Application Priority Data

Jun. 27, 1985 [JP] Japan .............................. 60-97776[U]
Jun. 28, 1985 [JP] Japan .............................. 60-99778[U]

[51] Int. Cl.$^4$ .......................... G02B 15/00; G02B 7/10
[52] U.S. Cl. .................................. 350/429; 354/195.11
[58] Field of Search ............... 350/429, 430, 449, 450; 354/286, 228, 233, 195.1, 195.11, 195.12, 195.13

[56] References Cited

U.S. PATENT DOCUMENTS

| | | | |
|---|---|---|---|
| 3,658,411 | 4/1972 | Price | 350/429 |
| 4,161,756 | 7/1979 | Thomas | 350/429 |
| 4,273,414 | 6/1981 | Shimojima | 350/429 |
| 4,636,041 | 1/1987 | Kotaka et al. | 350/429 |

Primary Examiner—Bruce Y. Arnold
Assistant Examiner—Loha Ben
Attorney, Agent, or Firm—Robin, Blecker, Daley & Driscoll

[57] ABSTRACT

A mounting mechanism for a zoom lens having a variator lens and a compensator lens in respective lens holding frames movable in fitting relation on guide bars suspended in a direction parallel to an optical axis, wherein a diaphragm unit is arranged in between the variator lens and the compensator lens, and a cam member for controlling the movement of the variator lens and the compensator lens is arranged on either one of the variator lens side and the compensator lens side of the diaphragm unit.

9 Claims, 5 Drawing Sheets

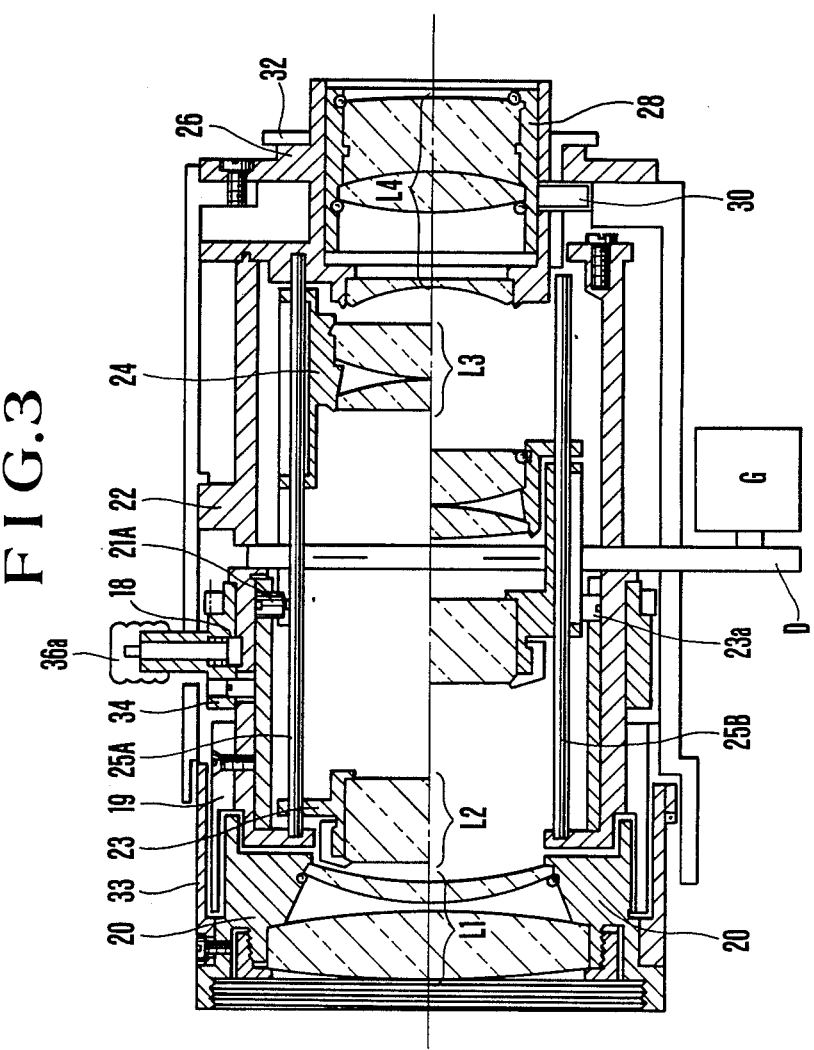

ZOOM LENS INCORPORATING DIAPHRAGM

BACKGROUND OF THE INVENTION

1. Field of the Invention

This invention relates to mounting mechanisms for zoom lenses and more particularly to mounting mechanisms for zoom lenses of the type in which a diaphragm is arranged between the variator and compensator.

2. Description of the Related Art:

For the zoom lens shown in FIG. 1(a) comprising a focusing lens $L_1$, a variator lens $L_2$, a compensator lens $L_3$ and an image forming lens $L_4$, this conventional type of mounting mechanism is constructed in such a manner that a focusing lens holder 1 containing the lens $L_1$ is helicoid-threadedly mounted on a body tube 2 upon rotation to move the focusing lens $L_1$ axially.

Also, the variator lens $L_2$ and the compensator lens $L_3$ are held in lens holders 3 and 4 respectively, and these lens holders 3 and 4 are arranged to axially move as guided by the known 3-bar method or guide bars 5. The axial movement of the variator $L_2$ and compensator $L_3$ is controlled by cam lifts 6a and 6b provided in a cam sleeve 6 rotatably fitted in the body tube 2. A zoom ring 7 is rotatably fitted on the body tube 2 and is drivingly connected to the cam sleeve 6 through a pin 8 planted on the cam sleeve 6. Also, the image forming lens $L_4$ then follows after a diaphragm 9 and its holder 10 is fixedly mounted in a rear fixed barrel 11 by screw fasteners 12.

The cam sleeve 6 is restrained from axial movement by front and rear mask plates 13 and 14 which bear the three guide bars 5.

In the above-described construction of the zoom lens mounting mechanism, it has been customary that the cam sleeve 6 is elongated so as to cover the entire space in which both variator $L_2$ and compensator $L_3$ move. In application to, for example, a zoom lens optical system having the diaphragm 9 in that space, therefore, the diameter of the outer lens barrel becomes very large (bulky) and the structure of the mounting mechanism becomes complicated, producing problems that the difficulty of assembly and the number of parts increase with increase in the production cost. Further, when applied to another optical system as shown in FIG. 1(a), because the diaphragm position is far away from the focusing lens, for the angular field is increased, the focusing lens becomes bulky, making the outer appearance of the zoom lens mounting awkward, and its weight very heavy.

In respect to the weight, the first component of the zoom lens accounts for 5 to 8 tenths of the entire body thereof. To reduce the weight, it is, therefore, required that materials of smaller specific gravity be employed, or the volume be minimized. Because such materials have a little freedom of choice, in order to achieve a desired reduction of the weight in such a manner as to preserve high grade of imagery, it is of great importance how to reduce the diameter of the front component. That is, as the volume may be considered to vary in proportion to the cube of the diameter, when the diameter can be reduced 10%, it becomes possible to reduce the volume by 27%. By the way, the diameter of the front component has to be determined by the larger of the diameters of the oblique light bundle in the wide angle end and the paraxial light bundle in the telephoto end. So, it becomes necessary to reduce both of them.

To eliminate this problem on optics, an attempt has been made by arranging the diaphragm in between the variator and compensator in Japanese Laid-Open patent application No. SHO 59-13212. With the optical system comprising, from front to rear, the focusing lens, variator, diaphragm, compensator and relay lens, even if the angle of field is widened, due to the shortened distance of the diaphragm to the focusing lens, there is a relatively large room of freedom of the oblique light bundle, thus permitting the focusing lens to be designed depending on the axial light bundle in the telephoto end. Therefore, by making the F-number in the telephoto end larger than that in the wide angle end, the focusing lens can be remarkably reduced as compared with the first optical system.

Another feature of the conventional lens arrangement of FIG. 1(a) is that the diaphragm is constructed as shown in FIG. 1(b) with a plurality of blades $9b_1$, $9b_2$, ..., $9bn$ pivotally mounted on a casing $9a$ and operates with a galvanometer drivingly connected through a crank lever $9c$ to a control lever $9d$ for the blades. And, the casing $9a$ is fixedly secured to the inner surface of the rear fixed barrel 11 by screw fasteners.

Because the bore of the outer fixed barrel 11 is round in shape, the casing $9a$ and the arrangement of the blades $9b$ must be conformed to that round shape.

For the present invention is applied to the mounting mechanism for the lens optical system, the system comprising, from front to rear, the focusing lens, the variator lens, the diaphragm, the compensator lens and the relay lens, which mechanism has the guide bars to suspend the variator and compensator lenses, the arrangement of such diaphragm unit in between the variator and compensator leads to an extraordinary increase of the diameter of the outer barrel.

SUMMARY OF THE INVENTION

An object of the present invention is to provide a mounting mechanism suited for a zoom lens optical system with a diaphragm arranged in a space between the variator and compensator to facilitate a reduction of the size and weight of the focusing lens and the size of the zoom section, thereby a reduction of the bulk and size and weight of the complete lens barrel with an advantage of lowering the production cost is achieved.

Particularly the diaphragm unit is formed to snugly fit in a space between the paired guide bars and its blades are arranged to move diametrically of the lens barrel by a drive meter.

Another object of the invention is, therefore, to provide a mounting mechanism which allows for making the most of the above-described merits of the optical system.

BRIEF DESCRIPTION OF THE DRAWINGS

FIG. 3 is a longitudinal section view of another embodiment of the invention.

DETAILED DESCRIPTION OF THE PREFERRED EMBODIMENTS

Figure 1A:
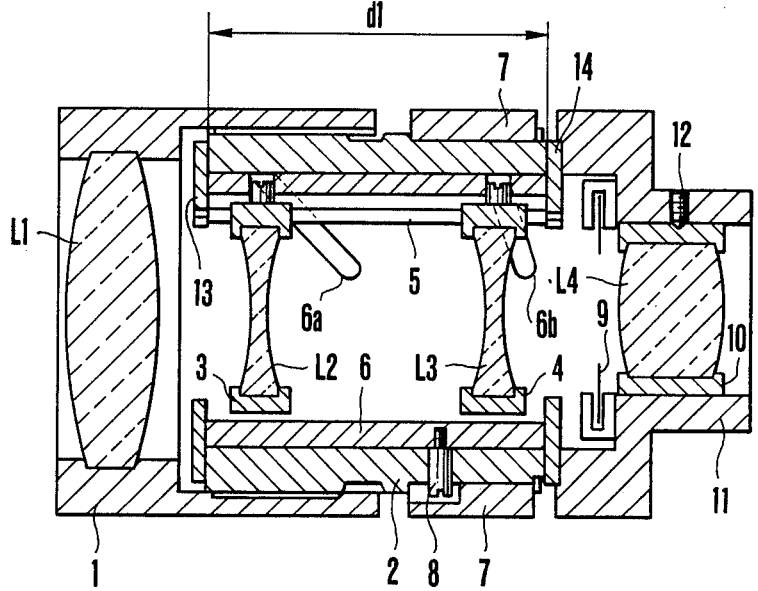
FIG. 1(a) is a longitudinal section view of the conventional mounting mechanism for zoom lens.
Figure 1B:
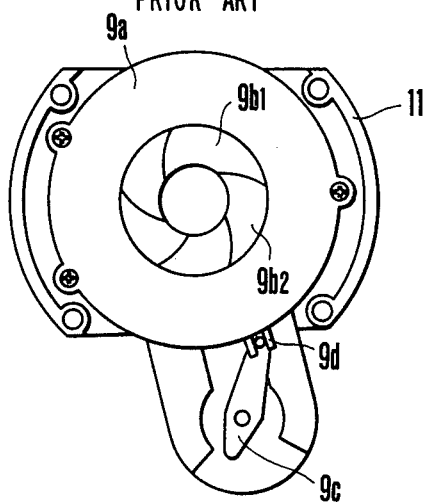
FIG. 1(b) is an elevational view of the conventional diaphragm unit.
Figure 2A:
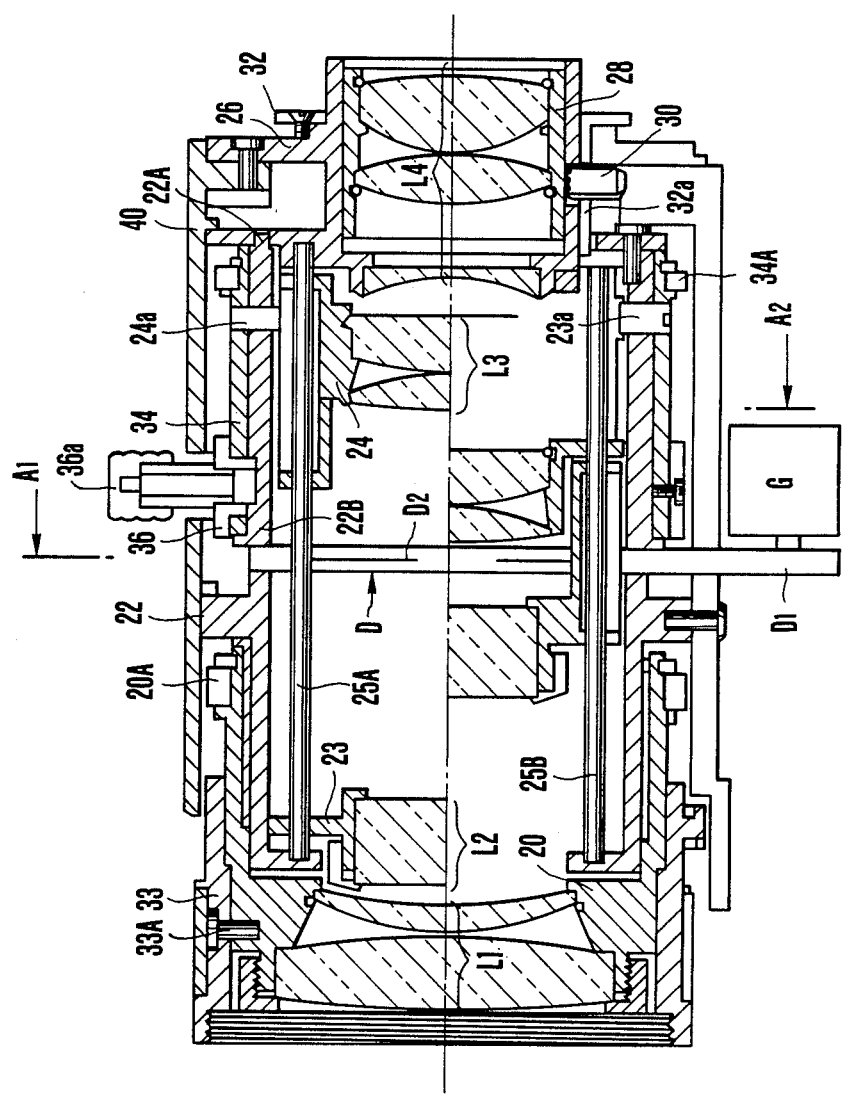
FIG. 2(a) is a longitudinal section view of an embodiment of a mounting mechanism for zoom lens according to the invention.
Figure 2B:
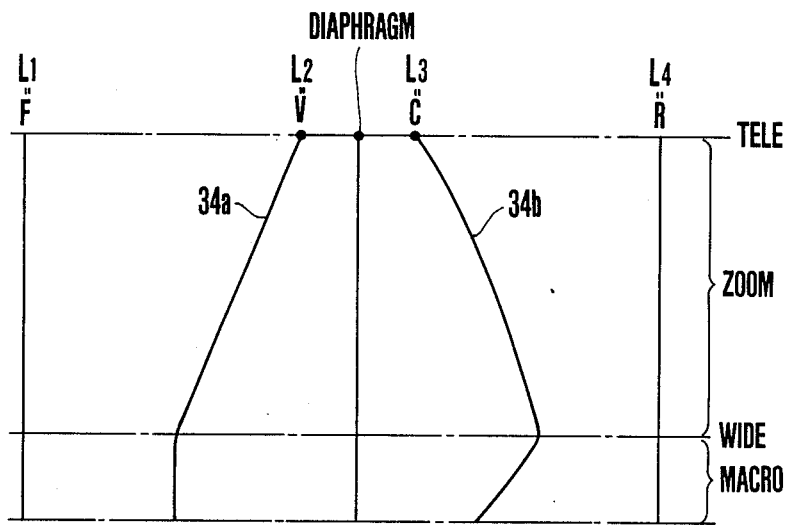
FIG. 2(b) is a diagram illustrating the zooming movement of the zoom lens of FIG. 2(a).

In FIGS. 2(a) and 2(b) there is shown one embodiment of the present invention where the same reference characters have been employed to denote the similar parts to those of the conventional one shown in FIG. 1(a). The upper half of FIG. 2(a) illustrates the lens arrangement when in wide angle setting, and the lower half when in telephoto setting. A holder 20 containing the focusing lens $L_1$ is helicoid-threadedly mounted on the front end of the outer surface of a body tube 22 and has a geared portion 20A formed in the outer surface thereof through which the rotative-axial movement of the holder 20 can be performed by an automatic focusing device (not shown) to effect focusing. The variator $L_2$ is held in a holder 23 which is axially moved as guided by a pair of bars 25A and 25B. Next, positioned in a space between the variator $L_2$ and the compensator $L_3$, in a diaphragm unit in fixedly secured relation to the body tube 22. The diaphragm unit D comprises an apertured plate $D_1$ fixedly mounted to the body tube 22, a slidable blade $D_2$ and a drive connection lever g2 through which rotation of the output shaft g1 of a galvanometer G is transmitted to the blade $D_2$ so that the size of aperture opening varies. The compensator $L_3$ is held in a holder 24 which is axially moved as guided by the common bars 25A and 25B of the variator holder 23. As shown in FIG. 2(e), the variator holder 23 is formed from a cylindrical portion 23A, a flange 23B, an integral boss 23C which has a bore through which the guide bar 25B extends, and a connection plate 23D carrying a cam follower roller 23a, the connection plate being fixedly secured to the boss 23C by screw fasteners. The compensator holder 24 is formed from a cylindrical portion 24A, a flange 24B and a boss 24C extending forwardly of the front surface of the flange 24B and having a bore through which the guide bar 25A extends. 24D is a hole in which a cam follower roller 24a is mounted. The image forming lens $L_4$ is divided into two parts, of which the front part is fixedly mounted to the front end of a rear body tube 26, and the rear part is held in a holder 28 which is movably fitted in the inner diameter of the rear body tube 26 so that after the back focal distance has been adjusted to the presetting, the holder 28 is fixedly secured in the thus-adjusted axial position by a lock screw 30 when tightened in a radial direction. A bayonet coupling 32 by which the lens mounting is to be releasably attached to a lens mount on a camera housing (not shown) is fixedly mounted to the rear tube 26 and has a rearward axial extension 32a which bears the lock screw 30 in frictionally screw-threaded relation. A focusing ring 33 is fixedly secured to the focusing lens holder 20 by a screw fastener 33A upon rotation to axially move in unison with the focusing lens holder 20. A cam sleeve 34 has two camming slots for the roller 23a on the variator holder 23 and the roller 24a on the compensator holder 24 and is rotatably fitted on the outer diameter of the main body tube 22. When rotated by the zoom ring 36, the cam sleeve 34 moves the variator $L_2$ and the compensator $L_3$ axially simultaneously while controlling the coordinated adjustment of the axial positions thereof.

The length of the cam sleeve 34 is taken at a distance from the rear end 22A of the main body tube 22 to a point 22B just behind the diaphragm unit D.

The camming slots of the cam sleeve 34 are formed so that the loci of movement of the variator $L_2$ and the compensator $L_3$ have respectively a linear line 34a and a curved line 34b shown in FIG. 2(b). So, as shown in FIG. 2(b), the total zooming movement of the variator $L_2$ lies in a space between the diaphragm unit D and the focusing lens $L_1$, and the total zooming movement of the compensator $L_3$ lies in a space between the diaphragm unit D and the relay lens $L_4$.

For motorized zooming, the cam sleeve 34 is provided with a gear 34A at the rear end thereof.

To manually operate the cam sleeve 34, a zoom actuator knob 36a is connected through a zooming 36 to the cam sleeve 34. 40 is an outer barrel.

Figure 2C:
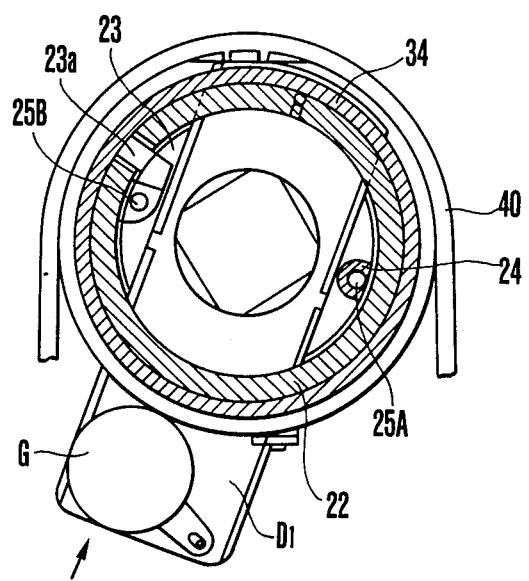
FIG. 2(c) is a cross-sectional view taken along line $A_1$—$A_2$ of FIG. 2(a).
Figure 2D:
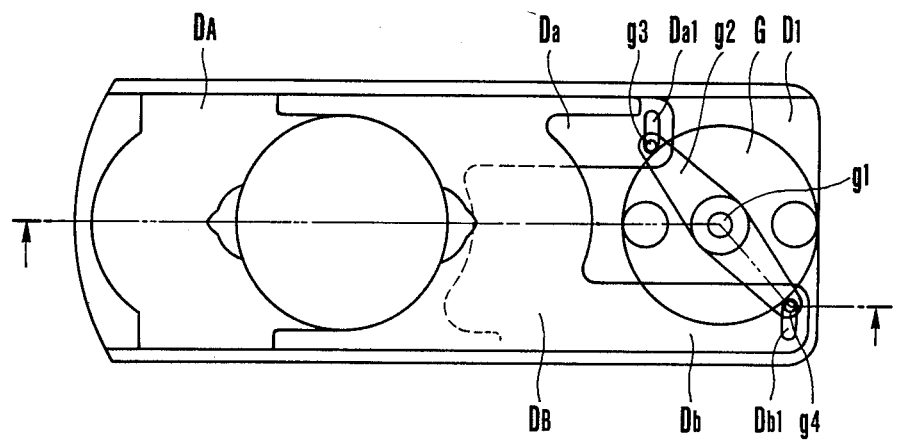
FIG. 2(d) is a plan view of the diaphragm unit.
Figure 2E:
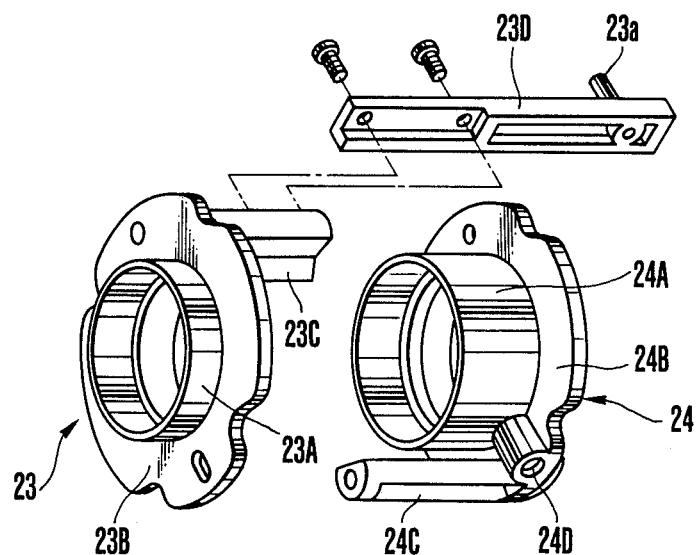
FIG. 2(e) is an exploded perspective view of the lens holders 23 and 24.

Referring to FIGS. 2(c) and 2(d), the diaphragm unit includes a rectangular base plate $D_1$ having a circular aperture extending therethrough and supports sliding movement of blades $D_A$ and $D_B$, with blade $D_A$ atop blade $D_B$. Blades $D_A$ and $D_B$ have semicircular inward end surfaces cooperatively defining differently sized openings in registry with the base plate aperture as the relative positions of the blades are changed.

Meter G is fixedly mounted on base plate D1 and has an output shaft g1 connected with two-arm crank lever g2. Pins g3 and g4 on the ends of lever g2 are disposed in slots Da1 and Db1 of the slidable blades. As lever g2 rotates in clockwise sense from its position illustrated in FIG. 2(d), blade $D_A$ will be moved rightwardly and blade $D_B$ will be moved leftwardly effecting a lessening of the size of the opening formed by the blade semicircular surfaces.

Turning to FIG. 2(c), base place D1 is of generally rectangular configuration and, upon assembly with lens barrel 22 as shown, has its longitudinal axis disposed radially of barrel 22. The transverse dimension of base plate D1 will be seen to be less than the spacing of guide bars 25A and 25B radially of lens barrel 22, such that the diaphragm unit may be inserted radially into the lens barrel as is indicated by the arrow below meter G in FIG. 2(c). As noted above, this structure provides for a snug fit of the diaphragm unit in a space between the guide bars and for the blades $D_A$ and $D_B$ to move diametrically of the lens barrel.

FIG. 3 illustrates another embodiment of the invention where the cam sleeve 34 is arranged on the front or leftward side of the diaphragm unit D, as contrasted with the arrangement of FIG. 2(a). Corresponding components are carried over with like reference numerals from the FIG. 2(a) embodiment. Guide 19 and roller 21A are particular to the FIG. 3 embodiment.

According to the present invention, that type of zoom lens which has the diaphragm unit D between the variator and the compensator can be employed. For this reason, a zoom lens mounting mechanism which has the advantages arising from the above-described merits of that optical system can be obtained.

An additional advantage is that because the arrangement of the cam sleeve in only one of the front and rear hand side spaces of the diaphragm suffices, the length of the cam sleeve can be made far shorter and, therefore, the tolerance for the inner diameter of the cam sleeve may be set gentler than was heretofore possible. Thus, the production cost is reduced.

What is claimed is:

1. A zoom lens, comprising:

a lens barrel;

first and second lens means disposed in said lens barrel for effecting zoom photographing;

first and second movement guide means disposed in diametrically spaced relation across said lens barrel for supporting said first and second lens means for axial movements thereof in said barrel; and diaphragm means for providing aperture variation and supported at least in part in said lens barrel axially between said first and second lens means, said diaphragm means having a first dimension less than said guide means diametrical spacing and thereby being radially insertable into said lens barrel.

2. The invention claimed in claim 1, wherein said diaphragm means includes first and second slidable blades for providing said aperture variation.

3. The invention claimed in claim 2, wherein said blades are slidable diametrically of said lens barrel.

4. The invention claimed in claim 1, further including a cam sleeve defining said axial movements, said cam sleeve being disposed fully to one side of said diaphragm means axially of said lens barrel.

5. A zoom lens, comprising:

a lens barrel;

first and second lens means disposed in said lens barrel for effecting zoom photographing;

diaphragm means for providing aperture variation and supported at least in part in said lens barrel axially between said first and second lens means; and a cam sleeve defining axial movements of said first and second lens means, said cam sleeve being disposed fully to one side of said diaphragm means axially of said lens barrel, said cam sleeve further being deviated so as not to overlap with said diaphragm means in the radial direction.

6. The invention claimed in claim 5, further including first ad second movement guide means disposed in diametrically spaced relation across said lens barrel for supporting said first and second lens means for cooperatively accomodating said axial movements in said barrel.

7. The invention claimed in claim 6, wherein said diaphragm means has a first dimension less than said guide means diametrical spacing and thereby is radially insertable into said lens barrel.

8. The invention claimed in claim 5, wherein said diaphragm means includes first and second slidable blades for providing said aperture variation.

9. The invention claimed in claim 8, wherein said blades are slidable diametrically of said lens barrel.

* * * * *